(No Model.)   
J. C. ANDERSON.  
CRANK AND PEDAL MECHANISM FOR BICYCLES.  
No. 578,183. Patented Mar. 2, 1897.
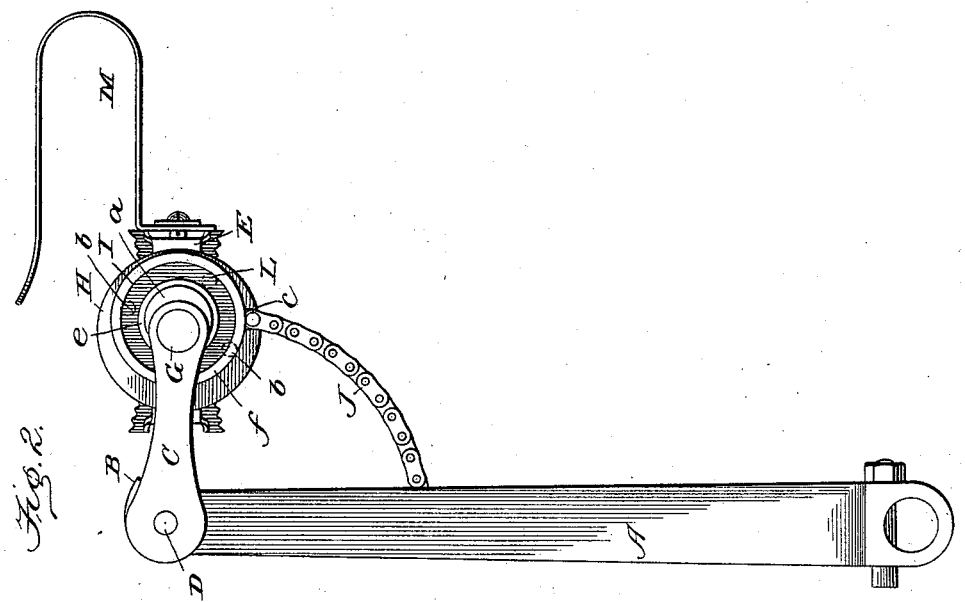
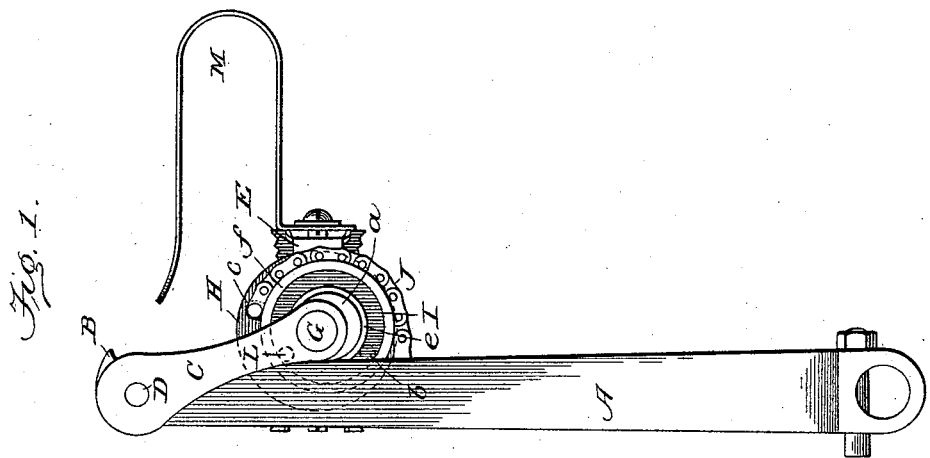
WITNESSES:  
Edwin L. Bradford  
N. Curtis Lammond  
INVENTOR  
James C. Anderson  
BY  
Wm. C. McIntire  
ATTORNEY.

(No Model.) 2 Sheets—Sheet 2.
J. C. ANDERSON.
CRANK AND PEDAL MECHANISM FOR BICYCLES.
No. 578,183. Patented Mar. 2, 1897.
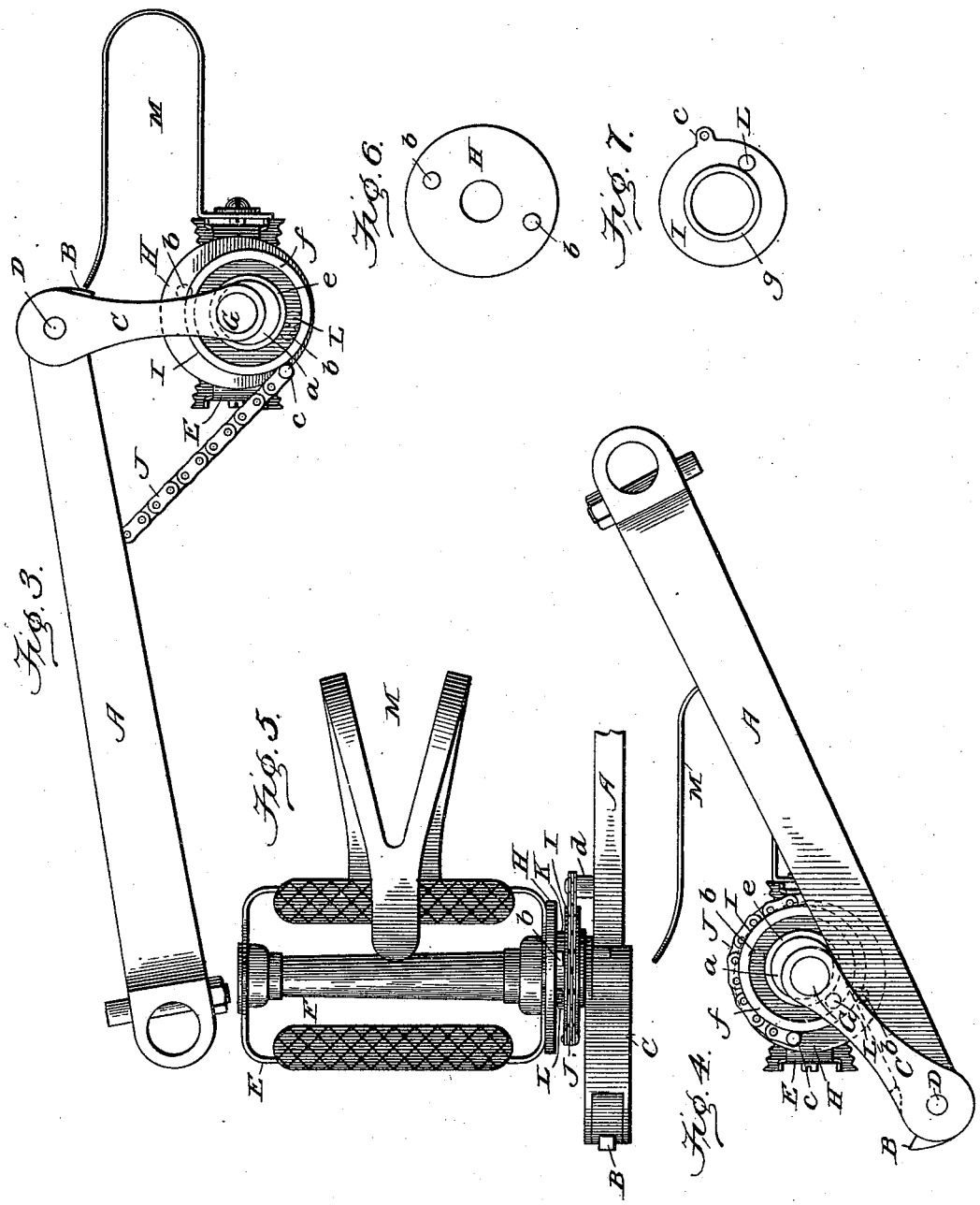
WITNESSES:
Edwin L. Bradford
N. Curtis Lammond
INVENTOR
James C. Anderson
BY
Wm C. W. Intire
ATTORNEY.

UNITED STATES PATENT OFFICE.

JAMES C. ANDERSON, OF HIGHLAND PARK, ILLINOIS.

CRANK AND PEDAL MECHANISM FOR BICYCLES.

SPECIFICATION forming part of Letters Patent No. 578,183, dated March 2, 1897.

Application filed December 21, 1896. Serial No. 616,536. (No model.)

*To all whom it may concern:*

Be it known that I, JAMES C. ANDERSON, a citizen of the United States, residing at Highland Park, in the county of Lake and State of Illinois, have invented certain new and useful Improvements in Crank and Pedal Mechanism for Bicycles; and I do hereby declare the following to be a full, clear, and exact description of the invention, such as will enable others skilled in the art to which it appertains to make and use the same.

My invention relates to certain new and useful improvements in bicycles, and particularly to the driving-cranks and pedals thereof.

In bicycles as at present constructed and used it is common to connect the pedal-cranks rigidly to the opposite ends of a driving-shaft carrying a sprocket-wheel, over which and another sprocket-wheel on the axle of the rear driving-wheel traverses an ordinary sprocket-chain. The speed and power in such a construction are regulated by the relative sizes of the sprocket-wheels and the length of the pedal-cranks, and it is a well-recognized principle that when what is known as "high gear" is provided to secure greater speed a concomitant disadvantage ensues in the fact that the leverage of the cranks is decreased, and consequently when the bicycle is driven upgrade the ordinary power is applied at a disadvantage, or, in other words, greater power is required than would be necessary in low gear; and it is also a well-recognized fact that in driving the crank of a bicycle, under the law of human anatomy, a greater range of movement can be given in a forward direction than in a downward, rear, and upward movement of the foot; and in view of these considerations my invention has for its objects to increase the speed of bicycles by the employment of high gearing and at the same time utilize the applied power with greater advantage; and with these ends in view my invention consists in the construction and arrangement of the cranks and pedals hereinafter more fully described, whereby the cranks are extended and contracted during their revolutions, so that the power exerted by the rider is applied with the greatest advantage.

In order that those skilled in the art to which my invention appertains may know how to make and use the same, I will proceed to describe the construction and action of my improvements, referring by letters to the accompanying drawings, in which—

Figure 1 is a side view of my improved crank and pedal at the highest point of its travel and just before it begins its forward movement. Fig. 2 is a similar view showing the change that takes place immediately after the forward movement of the crank has begun. Fig. 3 is a similar view showing the relation of the parts as the crank approaches a horizontal position on the downward stroke; Fig. 4, a similar view showing the relation of the parts as they approach a horizontal line on the rear and upward stroke. Fig. 5 is a top or plan view with the crank broken away. Fig. 6 is an exterior or end view of the disk-hub of the pedal; and Fig. 7 is an interior plan view of a revoluble disk or small pulley mounted upon an eccentric extension of the crank, as will be hereinafter more fully explained.

Similar letters of reference indicate like parts in the several figures of the drawings.

A represents a crank of ordinary construction so far as relates to the way in which it may be secured to the crank-shaft, but longer than the usual six-and-a-half-inch crank. The free end of the crank is formed with a spur or shoulder B to limit the movement of the extension-piece C, which, as clearly shown, is pivoted at D to the crank.

The extension-piece is bifurcated at its pivoted end, so as to embrace the end of the crank A, and is grooved obliquely on the under edge, so that it may fold upon the crank, as shown clearly at Fig. 4. The outer end of the extension-piece C is formed with an eccentric wrist *a*, which constitutes a journal for a loose pulley or disk presently described.

E is an ordinary pedal-frame of rat-trap or other construction and with the usual hollow or tubular axle F rotating on ball-bearings around the pedal-shaft G, which is secured by screw-thread centrally in the end of the extension C, so that the circular wrist *a* becomes eccentric to the axis of the pedal-shaft, as clearly shown in Figs. 1, 2, 3, and 4.

On the inner end of the pedal-frame E is secured a metal disk H, through which the pedal-shaft passes, and this disk is provided with diametric cylindrical studs b b, but if deemed desirable one of said studs may be dispensed with, as will be hereinafter explained.

I is a loose pulley or disk which is grooved circumferentially to constitute a track for a light chain J, which is pivotally connected at one end to a lug c on the periphery of the said disk, and at the other end to a lateral wrist d, extending from the crank A. The disk I is cut away on its exposed face, leaving a hub e and rim f, and the intervening groove may be used as a seat for a spring, if so desired, to hold the disk against unnecessary rotation, and the interior face of the disk is preferably countersunk, as shown at g, Fig. 7, to take a bearing upon a circular extension or hub on the nut K, which secures the ball-bearings in place. This disk is provided on the face adjacent to the disk end H of the pedal with a cylindrical stud L, which is adapted to contact with the studs b on the face of disk H, or with the single stud thereon when the other is dispensed with, as will be better understood from the description given of the operation of the several parts.

The pedal-frame is provided with toe-pieces M, and if thought desirable each pedal may be provided with two toe-pieces arranged on opposite sides. The drawings represent a crank of the usual length extended a distance equal to the length of the extension C, so that it will be understood that when the said extension is folded up, as shown at Figs. 1 and 4, the leverage length of the crank is substantially such as the ordinary crank (six and one-half inches) and when the extension C is thrown out into the position shown at Figs. 2 and 3 the power is applied at the point D, (the pivot of the extension-piece,) which is designed to be two inches farther from the crank-shaft than the point where the power is applied when the extension is folded, as shown at Figs. 1 and 4.

Assuming that the crank is in the position shown at Fig. 1, the forward movement of the leg and foot of the rider will cause the extension C to travel outward two inches and into the position seen at Fig. 2, so that the power is then applied two inches farther away from the axis of the crank-shaft, and consequently greater leverage is secured. As the crank is moved downwardly and reaches a horizontal position the stud L on the loose chain-pulley I comes in contact with the stud b on the disk H, as seen in dotted lines at Fig. 3, (which is shown slightly above the horizontal simply for convenience of arrangement of the figures on the sheet,) thus interlocking the chain-pulley I and pedal-disk H, and the chain J is stretched into taut condition, the disks H and I being held against independent rotation by the contact between the studs L and b. The continued rotation of the crank causes the chain J to wind upon the periphery of the disk I as the pedal rotates upon its shaft (the chain-pulley and pedal-disk being interlocked, as described) and thus pull the free end of the extension C and the pedal toward the crank and into the position shown in Figs. 1 and 4, which will occur when the crank has passed a vertical line below the axis of motion, and after passing that line toward the position shown in Fig. 4 the eccentric rotation between the studs L and b permits the stud L to roll past the stud b, and consequently the disk I is free to rotate upon the wrist a and slacken the chain J, so that the outward movement of the extension C may again take place.

I have described the operation where only one stud b on disk H is used, but it will be apparent that two such studs can be used, if placed diametric to each other, in order that either tread-surface of the pedals may be used.

I do not wish to be limited to the exact details of construction shown and described, as they may be varied to some extent without departing from the spirit of my invention, which rests in the idea of a crank of greater length than those usually employed, and provided at its free end with a pivoted extension carrying the pedal, and mechanism intermediate between the pedal-frame and the main crank, which, through the revolution of the pedal-frame on its axis, causes the pedal extension to fold upon the crank proper as the latter moves rearwardly and upwardly.

Having described the construction and operation of my improvements, what I claim as new, and desire to secure by Letters Patent, is—

1. In a crank mechanism for bicycles, the combination with a crank A, pedal E F, and pivoted crank extension C, intermediate mechanism between the crank A and the pedal-shaft whereby the travel of the pedal-shaft and rotation of the pedal positively causes the extension C to approach the crank during the rear and upward travel of the pedal, as hereinbefore described.

2. In combination with the crank A, pivoted extension C, having eccentric wrist a, and the pedal-shaft G secured in the end of extension C, the pedal E F, disk H, having stud b, chain-pulley disk I, with stud L, and connecting-chain J, substantially as and for the purpose set forth.

In testimony whereof I affix my signature in presence of two witnesses.

JAMES C. ANDERSON.

Witnesses:
N. CURTIS LAMMOND,
D. G. STUART.